Dec. 23, 1941.　　　　R. G. AURIEN　　　　2,267,676
BRAKE ARRANGEMENT
Filed Feb. 21, 1940　　　　4 Sheets-Sheet 1
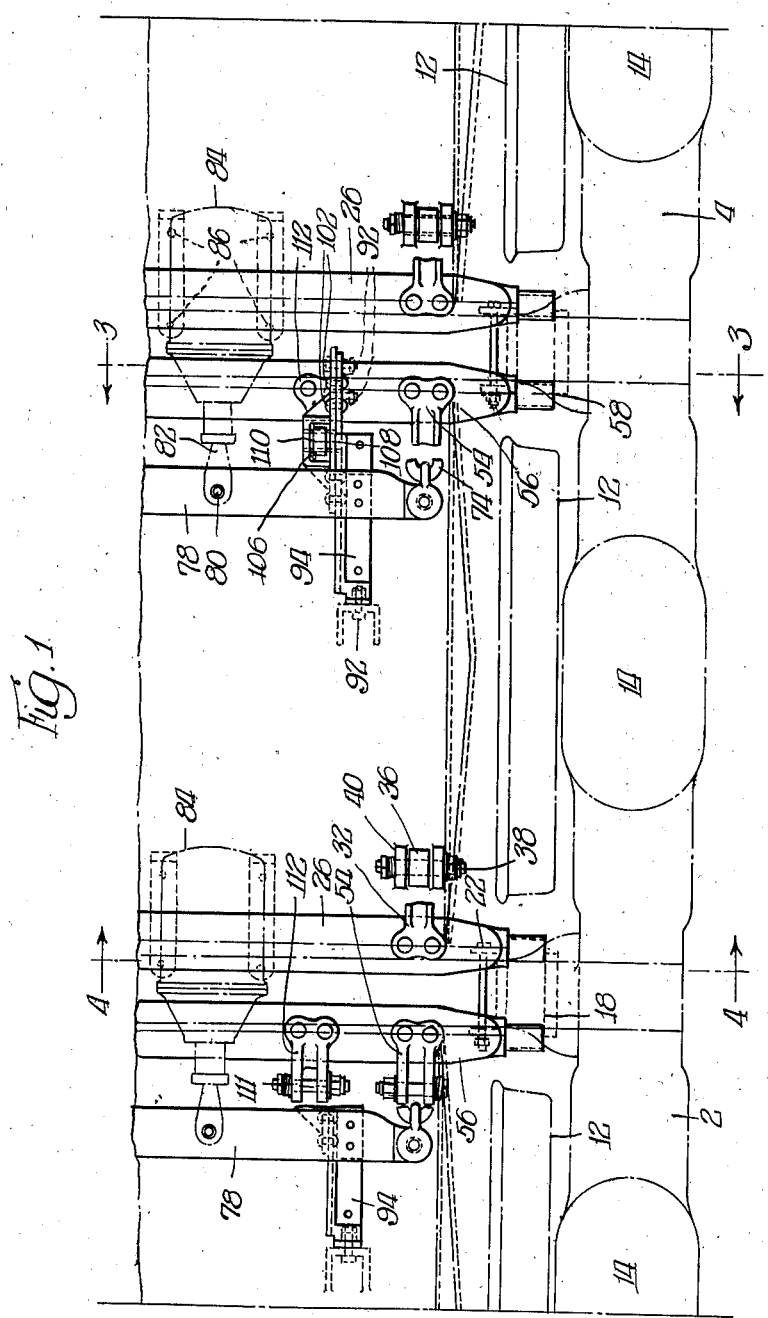
INVENTOR.
Ray G. Aurien,
BY
ATTORNEY.

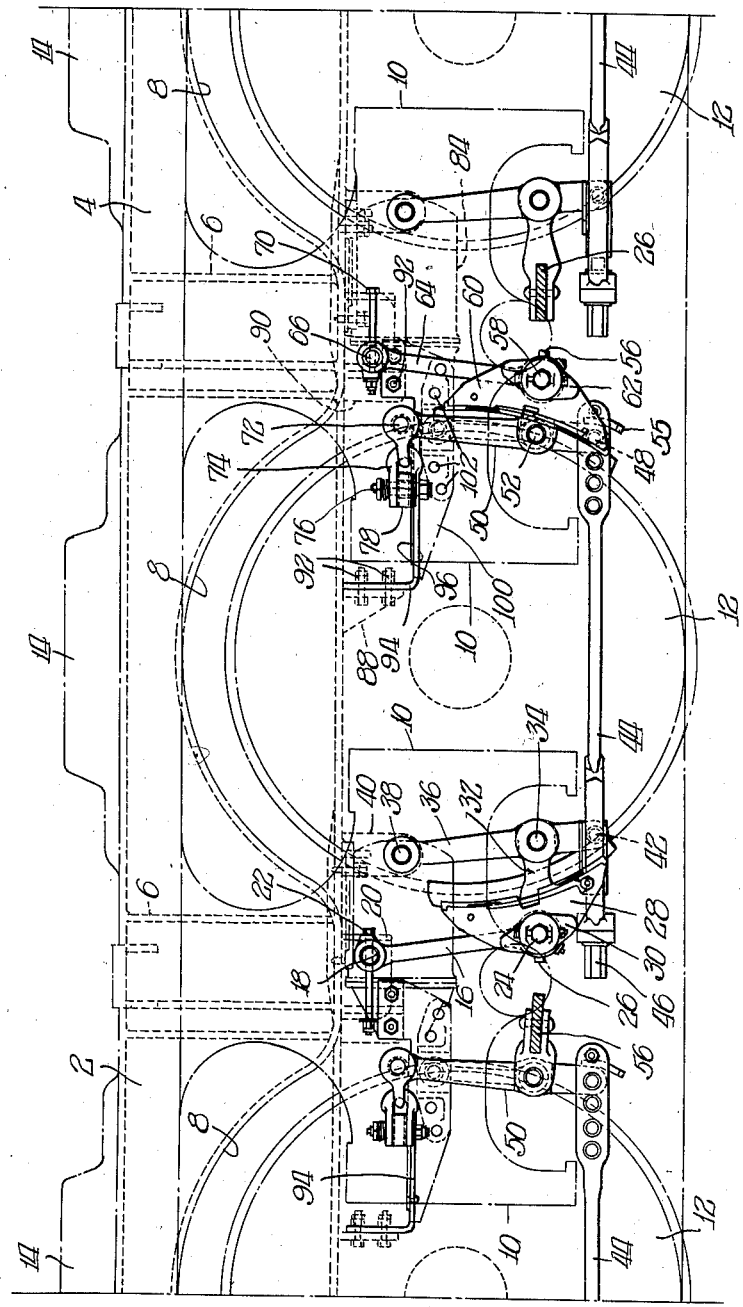

Dec. 23, 1941.   R. G. AURIEN   2,267,676
BRAKE ARRANGEMENT
Filed Feb. 21, 1940                 4 Sheets-Sheet 3
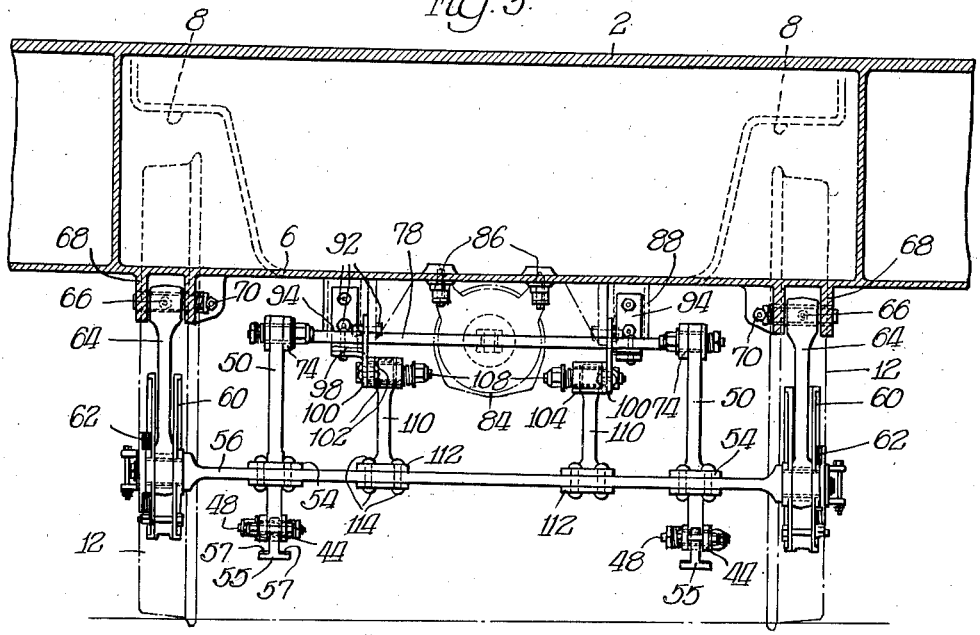
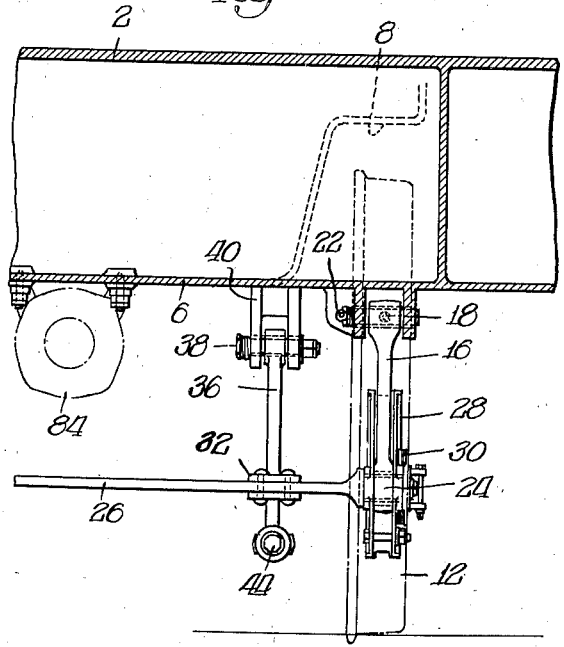
INVENTOR.
Ray G. Aurien,
BY
ATTORNEY.

Dec. 23, 1941.　　　　R. G. AURIEN　　　　2,267,676
BRAKE ARRANGEMENT
Filed Feb. 21, 1940　　　　4 Sheets-Sheet 4
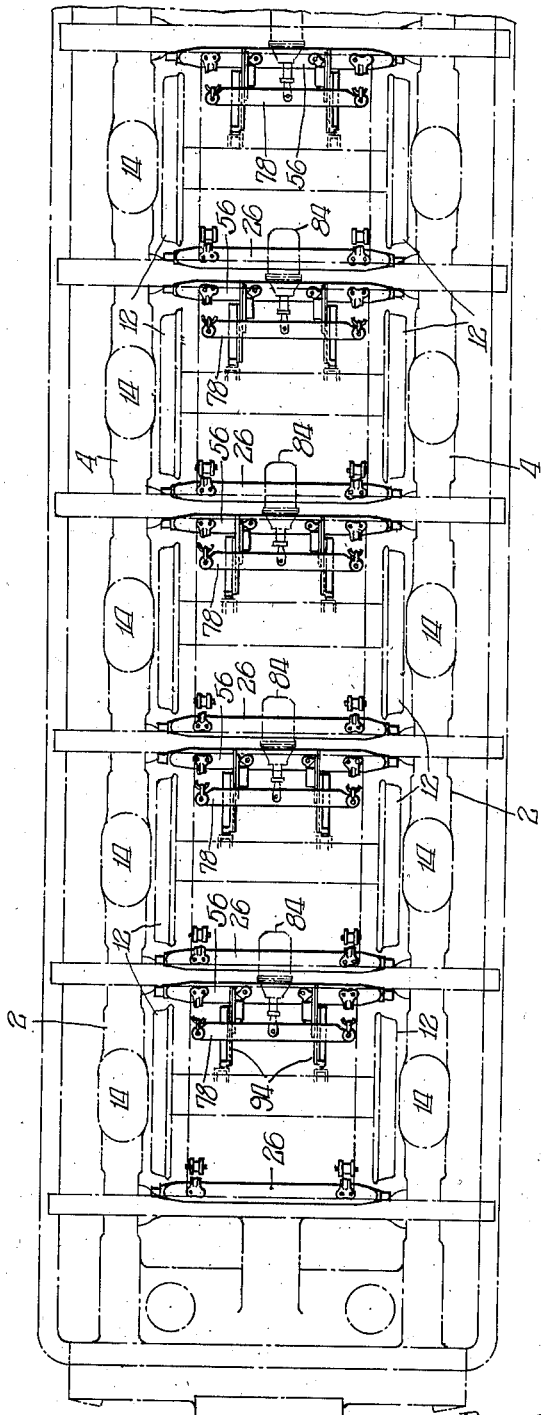
INVENTOR.
Ray G. Aurien,
BY
ATTORNEY.

Patented Dec. 23, 1941

2,267,676

UNITED STATES PATENT OFFICE 2,267,676

BRAKE ARRANGEMENT

Ray G. Aurien, Chicago, Ill., assignor to American Steel Foundries, Chicago, Ill., a corporation of New Jersey Application February 21, 1940, Serial No. 320,145

11 Claims. (Cl. 188—56)

My invention relates to brake rigging for railway equipment and more particularly to a clasp brake arrangement suitable for a tender truck having a plurality of wheel and axle assemblies journaled in the frame without the usual swiveling feature.

In certain heavy locomotives of modern types relatively long tenders are required. On such tenders the common practice is to utilize six-wheel swiveling trucks at each end thereof, each truck supporting one end of the tender body at one pivot point. In the design with which we are concerned a swiveling truck is afforded at one end of the tender and the remainder of the wheel and axle assemblies are journaled in the framework without any swiveling means afforded therefor.

An object of my invention is to provide a suitable clasp brake arrangement for nonswiveling wheel and axle assemblies such as those just described. My invention comprehends an arrangement applicable to any number of such wheel and axle assemblies aranged adjacent each other.

A different object of my invention is to afford a clasp brake arrangement for such a tender structure wherein independent power means will be supported on the tender frame for the clasp brake assembly associated with each wheel and axle assembly.

My invention also incorporates certain novel details in the manner in which the rigging is supported from the tender body, all of which are more particularly set forth in the detailed description of the drawings which follows. For the sake of clarity, details are omitted from certain figures where better shown in others.

Figure 1 is a fragmentary top plan view of a portion of tender framework supporting wheel and axle assemblies and brake rigging associated therewith.

Figure 2 is a fragmentary side elevation of the structure shown in Figure 1.

Figure 3 is a sectional view taken through the structure shown in Figures 1 and 2 substantially in the transverse vertical plane indicated by the line 3—3 of Figure 1.

Figure 4 is a sectional view taken through the structure shown in Figures 1 and 2 substantially in the transverse vertical plane indicated by the line 4—4 of Figure 1.

Figure 5 is a fragmentary top plan view of reduced size showing the manner in which my novel brake rigging is applied to one end of the tender structure.

Describing the structure in greater detail, the tender generally indicated at 2 is an integrally cast structure having the side rail 4 and the spaced transverse members 6, 6. Along the side rail is afforded a series of wheel openings 8, 8 defined in the vicinity of the axle end by the pedestal guides 10, 10 affording a means of connection to the usual journal boxes (not shown) of the supporting nonswiveling wheel and axle assemblies 12, 12. Upwardly projecting from the side rail are the series of side bearings 14, 14 in substantial alignment with the respective wheel and axle assemblies. Independent brake rigging is associated with each wheel and axle assembly and the following description is equally applicable to each wheel and axle assembly shown in the composite top plan view of Figure 5.

The rigging comprises the hanger 16 (Figure 2, left) pivotally hung as at 18 at its upper end from the bracket 20 integrally formed on the bottom of the transverse member 6 in longitudinal alignment with the adjacent wheels. The supporting pin at the pivot point 18 is retained against accidental removal by the safety pin 22. The lower end of the hanger 16 has a pivotal connection as at 24 to the trunnion end of the beam 26 and likewise supported on said trunnion end is the brake head 28, said brake head being afforded balance means as at 30 of well-known form. The opposite end of the beam 26 is similarly supported at the other side of the truck. Adjacent the end of the beam 26 is secured the fulcrum 32 and said fulcrum has a pivotal connection as at 34 to a point intermediate the ends of the dead truck lever 36, said truck lever being pivotally hung as at 38 from the bracket 40 integrally formed or otherwise secured on the under side of the transverse member 6. The lower end of the dead truck lever 36 has a pivotal and adjustable connection as at 42 to the slack adjuster pull rod 44, the said pivotal connection at 42 being made adjustable by the manual slack adjuster 46. The opposite end of each pull rod 44 has a pivotal and adjustable connection as at 48 to the lower end of the live truck lever 50, said live truck lever having a pivotal connection as at 52 at a point intermediate its ends to the fulcrum 54 secured on the adjacent end of the beam 56. The lower end of the live truck lever 50 is formed with an inverted T-shaped member 55 affording sliding supports at 57, 57 upon which the jaw end of the pull rod 44 may seat in case of loss or breakage of the pivot means at 48. On the trunnion end of the beam 56 is pivotally supported as at 58 the brake head 60 having the balancing means 62, and support for said brake beam and brake heads is afforded by the hanger 64, the lower end of which is connected at the pivotal point 58 and the upper end of which is hung as at 66 from the bracket 68 supported on the bottom of the adjacent transverse member 6. The safety pin 70 is afforded for the pin at the pivot point 66. The upper end of the live truck lever 50 has a pivotal connection as at 72 to the clevis means 74. The opposite end of the clevis means has a connection as at 76 to one end of the cylinder equalizer 78. The midpoint of the cylinder equalizer 78 has a pivotal connection as at 80 to the piston rod 82 of the power means or brake cylinder 84, said cylinder being secured as at 86, 86 on the under side of the transverse member 6. The connections at the opposite side of the truck are similar to those just described as shown in the transverse view of Figure 3 and similar parts are like designated.

At intermediate points on the transverse member 6 at opposite sides of the centerline are afforded brackets 88, 88 and 90, 90 and between the brackets 88 and 90 at each side of the centerline is secured as at 92, 92 the angle iron 94. On the top of the angle iron 94 the wear plate 96 affords sliding support as at 98 for the cylinder equalizer 78. On the down-turned flange 100 of the angle iron 94 is secured as by rivets 102 the casting 104 and centrally of said casting is formed the vertical opening 106 within which is pivoted as at 108 the balance hanger 110, the lower end of said balance hanger having a pivotal connection as at 111 (Figure 1, left) to the outer end of the fulcrum 112 which is secured as at 114 to the beam 56 inwardly of the fulcrum 54. The beam 56 is thus supported by hangers 64, 64 at opposite ends thereof, operated by live truck levers 50, 50 adjacent its opposite ends and balanced by the hangers 110, 110 between the said live truck levers.

The top plan view of Figure 5 illustrates the manner in which the brake rigging is associated with the series of adjacent nonswiveling wheel and axle assemblies. I have shown my novel rigging as associated with each wheel and axle assembly in a series of five adjacent assemblies but it is equally applicable to any number greater or less as may conveniently be required for the particular framework.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a railway vehicle, a frame having a series of adjacent rigid wheel connecting means, wheel and axle assemblies journaled in said wheel connecting means, and brake rigging for each assembly comprising hangers supporting brake heads and beams at opposite sides thereof, power means mounted on said frame at one side of the assembly, live truck levers fulcrumed intermediate their ends from the beam at the side of said assembly where said power means is positioned, dead truck levers supported from said frame and fulcrumed from the other of said beams, pull rods connecting the lower ends of the live and dead levers at opposite ends of the assembly, and a cylinder equalizer connected at its mid-point to said power means and at its opposite ends to said live truck levers, each of said pull rods having an adjustable connection with at least one of the associated levers.

2. In a railway vehicle, a frame having a series of adjacent rigid wheel connecting means, wheel and axle assemblies journaled in said wheel connecting means, and brake rigging for each assembly comprising hangers supporting brake heads and beams at opposite sides thereof, power means mounted on said frame at one side of the assembly, live truck levers fulcrumed intermediate their ends from the beam at the side of said assembly where said power means is positioned, dead truck levers supported from said frame and fulcrumed from the other of said beams, pull rods connecting the lower ends of the live and dead levers at opposite ends of the assembly, and a cylinder equalizer connected at its mid-point to said power means and at its opposite ends to said live truck levers, each of said pull rods having an adjustable connection with both of the associated truck levers.

3. In a railway vehicle, a rigid frame having a series of adjacent wheel connecting openings, a plurality of non-swiveling wheel and axle assemblies journaled in said openings, and brake means for each assembly comprising brake beams supported at opposite sides thereof, brake heads on the ends of said beams, a plurality of fulcrums on each of said beams at intermediate points, live truck levers connected to the beam fulcrums at one side of the assembly, dead truck levers hung from said frame and connected to the fulcrums of the other of said beams, pull rods connecting the live and dead levers at respective ends of said assembly below the level of said beams, power means on said frame at the side of said assembly adjacent said live truck levers, and an equalizing lever connected at its mid-point to said power means and at its opposite ends to said live truck levers, respectively, each of said pull rods having an adjustable connection with both of the associated levers.

4. In a railway vehicle, a rigid frame having a series of adjacent wheel connecting openings, a plurality of non-swiveling wheel and axle assemblies journaled in said openings, and brake means for each assembly comprising brake beams supported at opposite sides thereof, brake heads on the ends of said beams, a plurality of fulcrums on each of said beams at intermediate points, live truck levers connected to the beam fulcrums at one side of the assembly, dead truck levers hung from said frame and connected to the fulcrums of the other said beams, pull rods connecting the live and dead levers at respective ends of said assembly below the level of said beams, power means on said frame at the side of said assembly adjacent said live truck levers, and an equalizing lever connected at its mid-point to said power means and at its opposite ends to said live truck levers, respectively, certain of said levers having auxiliary support means for the adjacent ends of the associated pull rods, said auxiliary support means retaining said pull rods in normal position in case of accidental disconnection from the associated levers.

5. In a railway vehicle, a frame having a plurality of rigid pedestals defining wheel openings, non-swiveling wheel and axle assemblies journaled in said openings, and braking means for each assembly comprising hangers supporting brake heads and brake beams at opposite sides thereof, said hangers being pivotally connected at their upper ends to said frame and at their lower ends to the trunnion ends of said beams, fulcrums on each of said beams at spaced intermediate points, dead truck levers fulcrumed at their upper ends from said frame at one side of said assembly and connected at intermediate points to the fulcrums of the adjacent beam, live truck levers connected at intermediate points to the fulcrums of the beam at the opposite side of said assembly, pull rods connecting the live and dead truck levers at respective ends of said assembly below the level of said beams, power means mounted on said frame at the live truck lever side of said assembly, and an equalizer connected at its mid-point to its power means and at its opposite ends to said live truck levers, said live truck levers having auxiliary support means for the adjacent ends of the associated pull rods.

6. In a railway vehicle, a frame having a plurality of rigid pedestals defining wheel openings, non-swiveling wheel and axle assemblies journaled in said openings, and braking means for each assembly comprising hangers supporting brake heads and brake beams at opposite sides thereof, said hangers being pivotally connected at their upper ends to said frame and at their lower ends to the trunnion ends of said beams, fulcrums on each of said beams at spaced intermediate points, dead truck levers fulcumed from their upper ends at one side of said assembly and connected at intermediate points to the fulcrums of the adjacent beam, live truck levers connected at intermediate points to the fulcrums of the beam at the opposite side of said assembly, pull rods connecting the live and dead truck levers at respective ends of said assembly below the level of said beams, power means mounted on said frame at the live truck lever side of said assembly, and an equalizer connected at its mid-point to said power means and at its opposite ends to said live truck levers, each of said pull rods having an adjustable connection with both of the associated levers.

7. In a railway vehicle, a rigid frame having a series of adjacent wheel openings, non-swiveling wheel and axle assemblies journaled in said openings, and brake rigging for each assembly comprising hangers supporting brake heads and brake beams at opposite sides thereof, each of said beams having a plurality of fulcrums at spaced intermediate points, dead truck levers hung from said frame and connected to the fulcrums of the adjacent beam at one side of said assembly, live truck levers connected intermediate their ends to the beam fulcrums at the opposite side of said assembly, pull rods connecting the lower ends of the live and the dead truck levers at respective ends of the assembly, and operating means for said live truck levers comprising a cylinder supported on said frame intermediate said live truck levers, and an equalizer connected at its mid-point to the piston of said cylinder and at its opposite ends to said live truck levers respectively, each of said pull rods having an adjustable connection with both of the associated levers.

8. In a railway vehicle, a rigid frame having a series of adjacent wheel openings, non-swiveling wheel and axle assemblies journaled in said openings, and brake rigging for each assembly comprising hangers supporting brake heads and brake beams at opposite sides thereof, each of said beams having a plurality of fulcrums at spaced intermediate points, dead truck levers hung from said frame and connected to the fulcrums of the adjacent beam at one side of said assembly, live truck levers connected intermediate their ends to the fulcrums of the beam at the opposite side of said assembly, pull rods connecting the lower ends of the live and dead truck levers at respective ends of the assembly, and operating means for said live truck levers comprising a cylinder supported on said frame intermediate said live truck levers, and an equalizer connected at its mid-point to the piston of said cylinder and at its opposite ends to said live truck levers respectively, each of said pull rods having an adjustable connection with at least one of the associated levers, and each of said live truck levers having emergency support means for the adjacent end of the associated pull rod.

9. In a railway vehicle, a rigid frame a plurality of adjacent wheel openings, non-swiveling wheel and axle assemblies journaled in said openings, and brake rigging for each assembly comprising hangers supporting brake heads and brake beams at opposite sides thereof, dead truck levers hung from the frame at one side of the assembly and fulcrumed from the adjacent beam at points intermediate the ends of said levers, live truck levers fulcrumed intermediate their ends from the beam at the other side of the assembly, pull rods adjustably connecting the live and dead truck levers at the respective ends of the assembly below the level of said beams, power means on said frame at the live truck lever side of said assembly, and an equalizer having its mid-point connected to said power means and its opposite ends connected to said live levers respectively.

10. In a railway vehicle, a rigid frame, a plurality of adjacent wheel openings, non-swiveling wheel and axle assemblies journaled in said openings, and brake rigging for each assembly comprising hangers supporting brake heads and brake beams at opposite sides thereof, dead truck levers hung from the frame at one side of the assembly and fulcrumed from the adjacent beam at points intermediate the ends of said levers, live truck levers fulcrumed intermediate their ends from the beam at the other side of the assembly, pull rods adjustably connecting the lower ends of the live and dead truck levers at the respective ends of the assembly below the level of said beam, power means on said frame at the live truck lever side of said assembly, and an equalizer having its mid-point connected to said power means and its opposite ends connected to said live levers respectively, and brackets on said frame intermediate said live truck levers, each of said brackets affording sliding support for said equalizer and carrying balance means for the adjacent beam.

11. In a railway vehicle, a rigid frame, a plurality of adjacent wheel openings, non-swiveling wheel and axle assemblies journaled in said openings, and brake rigging for each assembly comprising hangers supporting brake heads and brake beams at opposite sides thereof, dead truck levers hung from the frame at one side of the assembly and fulcrumed from the adjacent beam at points intermediate the ends of said levers, live truck levers fulcrumed intermediate their ends from the beam at the other side of the assembly, pull rods adjustably connecting the live and dead truck levers at the respective ends of the assembly below the level of said beams, power means on said frame intermediate said live truck levers, an equalizer having its mid-point connected to said power means and its opposite ends connected to said live levers respectively, brackets on said frame intermediate said live truck levers, each of said brackets affording sliding support for said equalizer and carrying balance means for the adjacent beam, and emergency support means on each of said live truck levers for the adjacent end of the associated pull rod.

RAY G. AURIEN.